US007250571B2

(12) United States Patent
Magno

(10) Patent No.: US 7,250,571 B2
(45) Date of Patent: Jul. 31, 2007

(54) STUD SNAP AND LOCK NON-METALLIC SNAP-ON ELECTRICAL BOX

(75) Inventor: Joey Magno, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/405,239

(22) Filed: Apr. 17, 2006

(65) Prior Publication Data
US 2006/0231280 A1 Oct. 19, 2006

Related U.S. Application Data

(60) Provisional application No. 60/672,477, filed on Apr. 18, 2005.

(51) Int. Cl.
*H01H 9/02* (2006.01)
(52) U.S. Cl. .......................... 174/58; 174/481; 174/53; 174/57; 220/3.2; 220/3.3; 248/906
(58) Field of Classification Search .................. 174/58, 174/50, 48, 60, 57, 53, 480, 481, 503, 54, 174/63, 62; 220/3.3, 3.6, 3.8, 4.02, 3.2, 3.4, 220/3.5, 3.7, 3.9; 248/906, 900, 27.1, 27.3, 248/225.11; 439/535, 538; D13/152
See application file for complete search history.

(56) References Cited

U.S. PATENT DOCUMENTS

| 3,720,395 | A | * | 3/1973 | Schuplin ..................... 248/906 |
| 3,780,209 | A | * | 12/1973 | Schuplin ...................... 174/51 |
| 4,140,293 | A | * | 2/1979 | Hansen ..................... 248/217.2 |
| 4,971,280 | A | * | 11/1990 | Rinderer ..................... 248/906 |
| 5,004,199 | A | * | 4/1991 | Suk ............................ 248/906 |
| 5,408,045 | A | * | 4/1995 | Jorgensen et al. ............ 174/58 |
| 6,573,446 | B1 | * | 6/2003 | Umstead et al. .............. 174/50 |
| 7,179,995 | B2 | * | 2/2007 | Dinh ........................... 174/58 |
| 2006/0243473 | A1 | * | 11/2006 | Drane | |
| 2007/0007028 | A1 | * | 1/2007 | Borbolla | |

* cited by examiner

*Primary Examiner*—Angel R. Estrada
(74) *Attorney, Agent, or Firm*—Hoffmann & Baron, LLP

(57) ABSTRACT

An electrical box assembly for nail-free mounting to a stud. The assembly includes an electrical enclosure and a bracket affixed to the enclosure, the bracket defining a stud receiving cavity and a clamping leg. The clamping leg extends into the stud-receiving cavity. The leg is being movable between a first stud-receiving position and a second stud-securing position whereupon insertion of the stud into the cavity moves the clamping leg from the stud-receiving position to the stud-securing position thereby securing the enclosure to the stud.

12 Claims, 4 Drawing Sheets

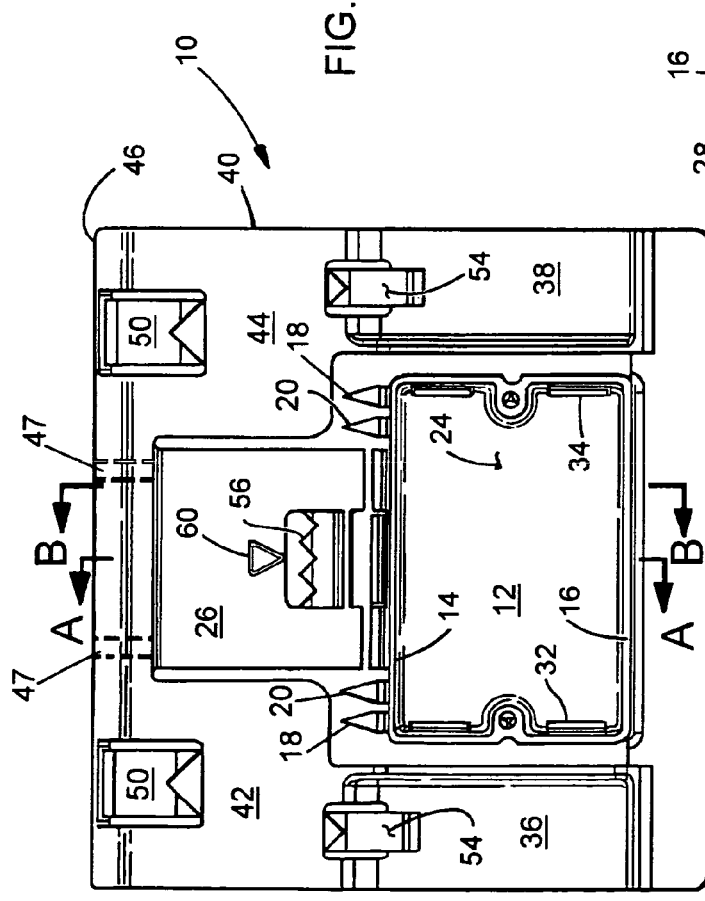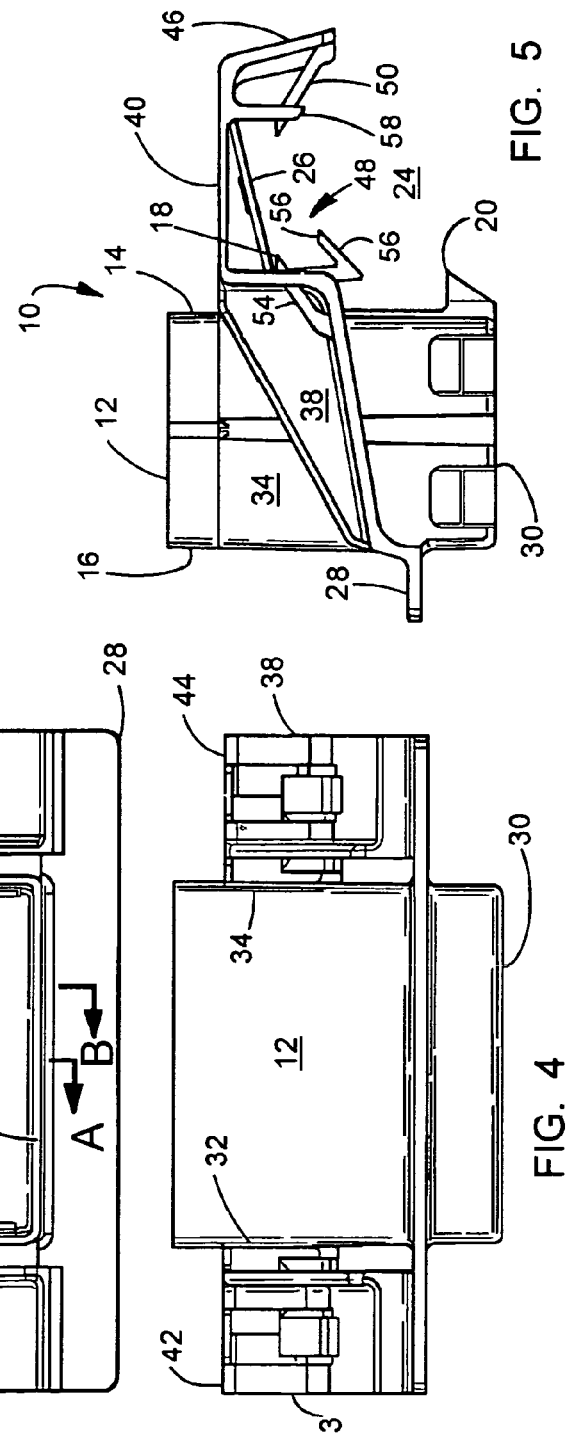

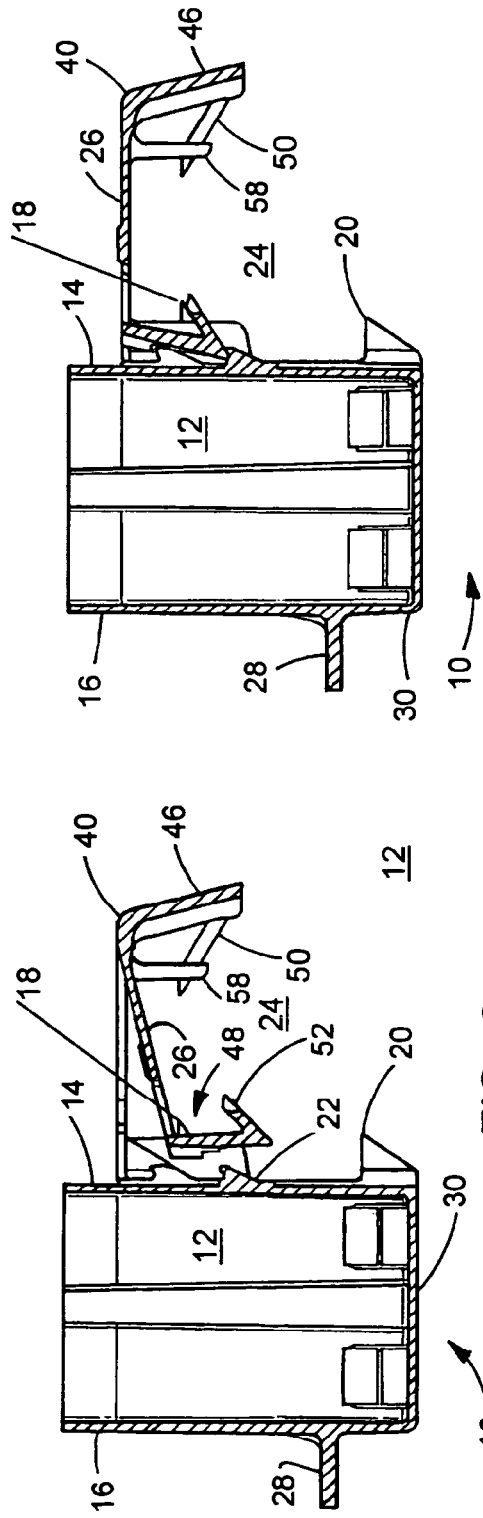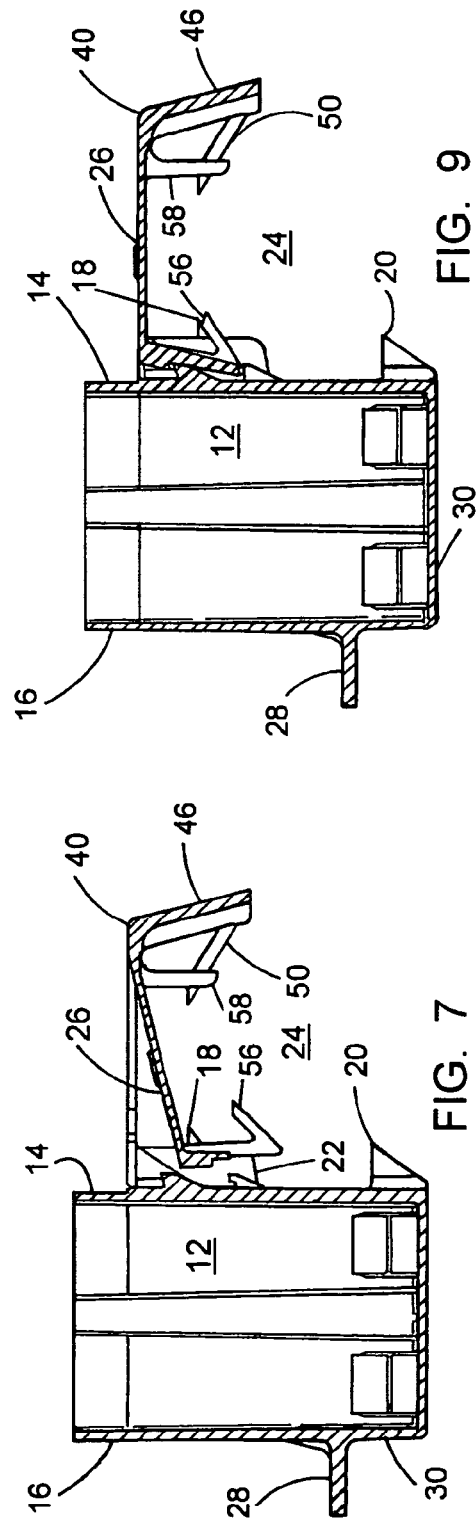

STUD SNAP AND LOCK NON-METALLIC SNAP-ON ELECTRICAL BOX

CROSS-REFERENCE TO RELATED APPLICATIONS

This application claims the benefit of U.S. Provisional Patent Application Ser. No. 60/672,477 filed on Apr. 18, 2005.

TECHNICAL FIELD

The present invention generally relates to an electrical enclosure, housing or assembly supported from a stud, and more particularly to a bracket affixed to the enclosure, housing or assembly that once applied to the stud, requires no further operation, installation step or hardware to meet industry codes.

BACKGROUND OF THE INVENTION

Electrical enclosures, frames, housings, boxes or the like are quite common and are extensively used to support fixtures to which high and low voltage wires are terminated. Examples of such fixtures are electrical switches, receptacles, telephone jacks, cable connections and other power or communication devices. Such enclosures supporting these fixtures are not free-standing and thus require support within the building structure if they are to be installed in accordance with local or national codes. These codes often specify a certain loading or series of forces the enclosure must withstand after being installed.

Perhaps the most common way of supporting such devices is via nails or screws inserted through openings in the device before being driven into a stud of the building. Other methods of securing the electrical enclosure to the building include a separate elongated metal bracket that spans between adjacent studs, the enclosure then being bolted or screwed to the bracket. Another method involves a metal bracket affixed directly to the box itself that is pushed onto or against a stud and then subsequently fastened in place via nails or screws.

As quick and simple as the above may appear, the operation of driving or fastening the nail or screw is still a secondary operation that must be completed after the box is initially positioned. This secondary operation requires time, some more than others, and thus prolongs the amount of time it takes to install the box in a fashion that will comply with local code. Such secondary operations also limit the number of boxes that may be installed in a given period of time.

To ease installation when it is known that a nail or screw is to be used, electrical outlet boxes are oftentimes made where the nail or screw is held captive on the device prior to installation. Thus, to cut down on the number of secondary steps required, the user need only drive the nail or screw home after the box is positioned against the stud. However, care has to be taken to insure that the step of screwing or nailing does not move the box out of position. Also, care has to be taken that this additional fastening hardware is not dropped or lost. Furthermore, the user has to be mindful of how the box is held during the driving operation so that the step of swinging a hammer or installing a screw does not inadvertently result in personal injury or damage to the enclosure.

Thus, it becomes desirable to avoid these secondary securement steps so that more boxes can be installed in the same period of time. It is also desirable to dispense with these separate fasteners or screws as this only adds cost and another assembly step in the manufacture of the final product. Furthermore, such fasteners can be lost. Safety is also a factor as one injury can result in considerable and quite unexpected cost and delay. Another desirable feature is to have the box automatically secured to the stud with no further operation required by the installer. Yet another desirable feature is a low cost box that can be secured as above while still complying with local codes and ordinances. These and other objects and advantages of this invention will be described in greater detail below.

SUMMARY OF THE INVENTION

An electrical box assembly for nail-free mounting to a stud is disclosed. The assembly includes an electrical enclosure and a bracket affixed to the enclosure, the bracket defining a stud receiving cavity and a clamping leg. The clamping leg extends into the stud-receiving cavity defined by the bracket. The clamping leg extends into the stud-receiving cavity. The leg is being movable between a first stud-receiving position and a second stud-securing position whereupon insertion of the stud into the cavity moves the clamping leg from the stud-receiving position to the stud-securing position thereby securing the enclosure to the stud.

In one embodiment, the clamping leg extends from the bracket and in a direction towards the enclosure.

In another embodiment, the bracket includes a flange extending from an edge thereof, the flange having at least one tooth for engagement with the stud and cooperating with the clamping leg. Movement of the leg to the stud-receiving position causes movement of the flange which forces the at least one tooth into engagement with the stud.

In yet another embodiment, the electrical box assembly includes one or more arms secured to the bracket. The one or more arms securing the electrical enclosure to the bracket and resisting movement of the electrical enclosure with respect to the bracket. A strut also may be secured to the electrical enclosure and be coupled to one or more of the arms.

Additional features and advantages will be readily apparent from the following detailed description, the accompanying drawings and the claims.

BRIEF DESCRIPTION OF THE DRAWINGS

FIG. 3 is a top plan view of the invention.

FIG. 4 is a front plan view of the invention.

FIG. 5 is a side plan view of the invention.

FIG. 6 is a side sectional view taken along Lines A-A of FIG. 3 showing the assembly in the unmounted position.

FIG. 7 is a side sectional view taken along lines B-B of FIG. 3 showing the assembly in the unmounted position.

FIG. 8 is a side sectional view taken along lines A-A of FIG. 3 showing the assembly in 25 the mounted position.

FIG. 9 is a side sectional view taken along lines B-B of FIG. 3 showing the assembly in the mounted position.

Like reference symbols in the various drawings indicate like elements.

DETAILED DESCRIPTION OF THE PREFERRED EMBODIMENTS

Figure 1:
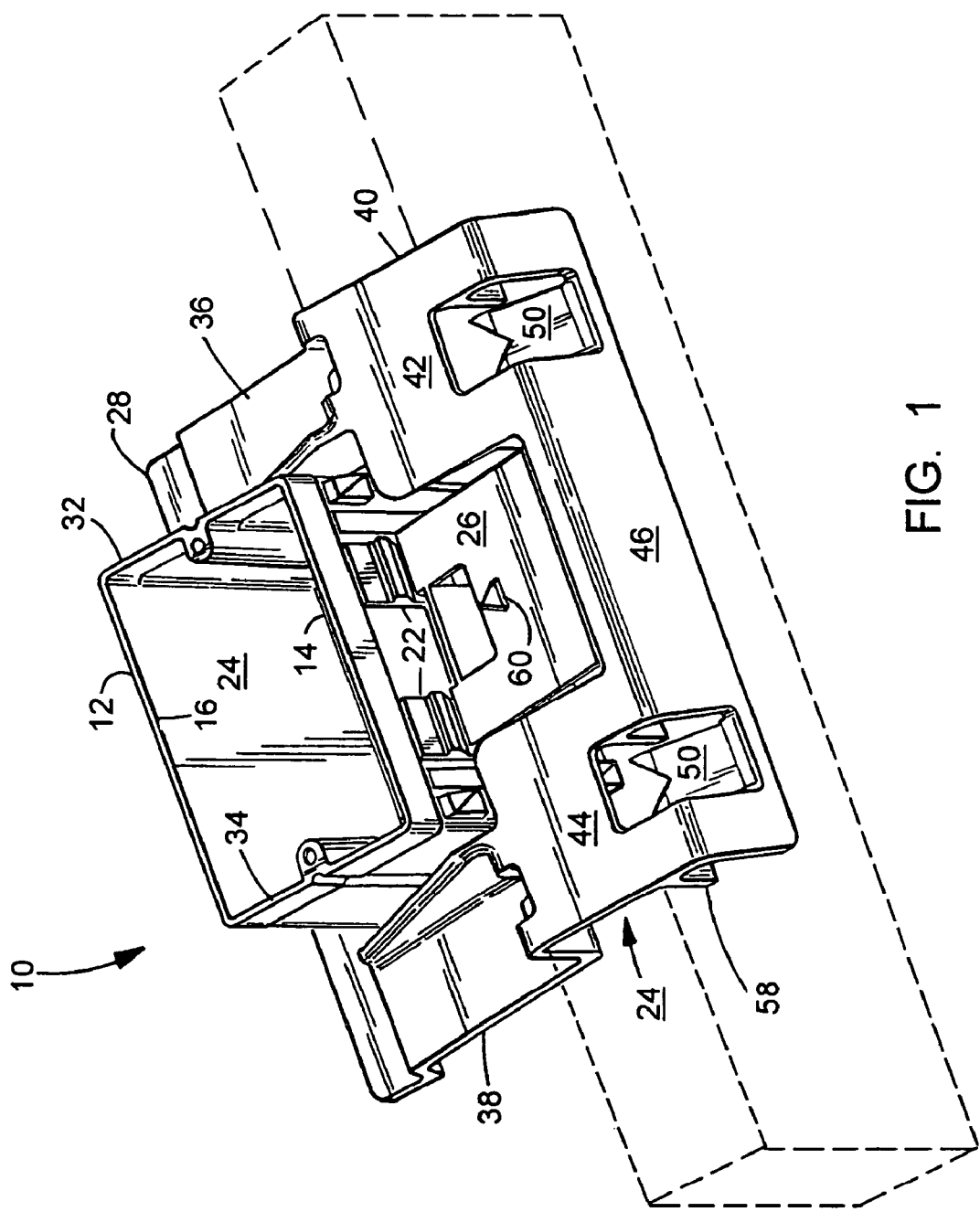
FIG. 1 is a top perspective view of the invention.
Figure 2:
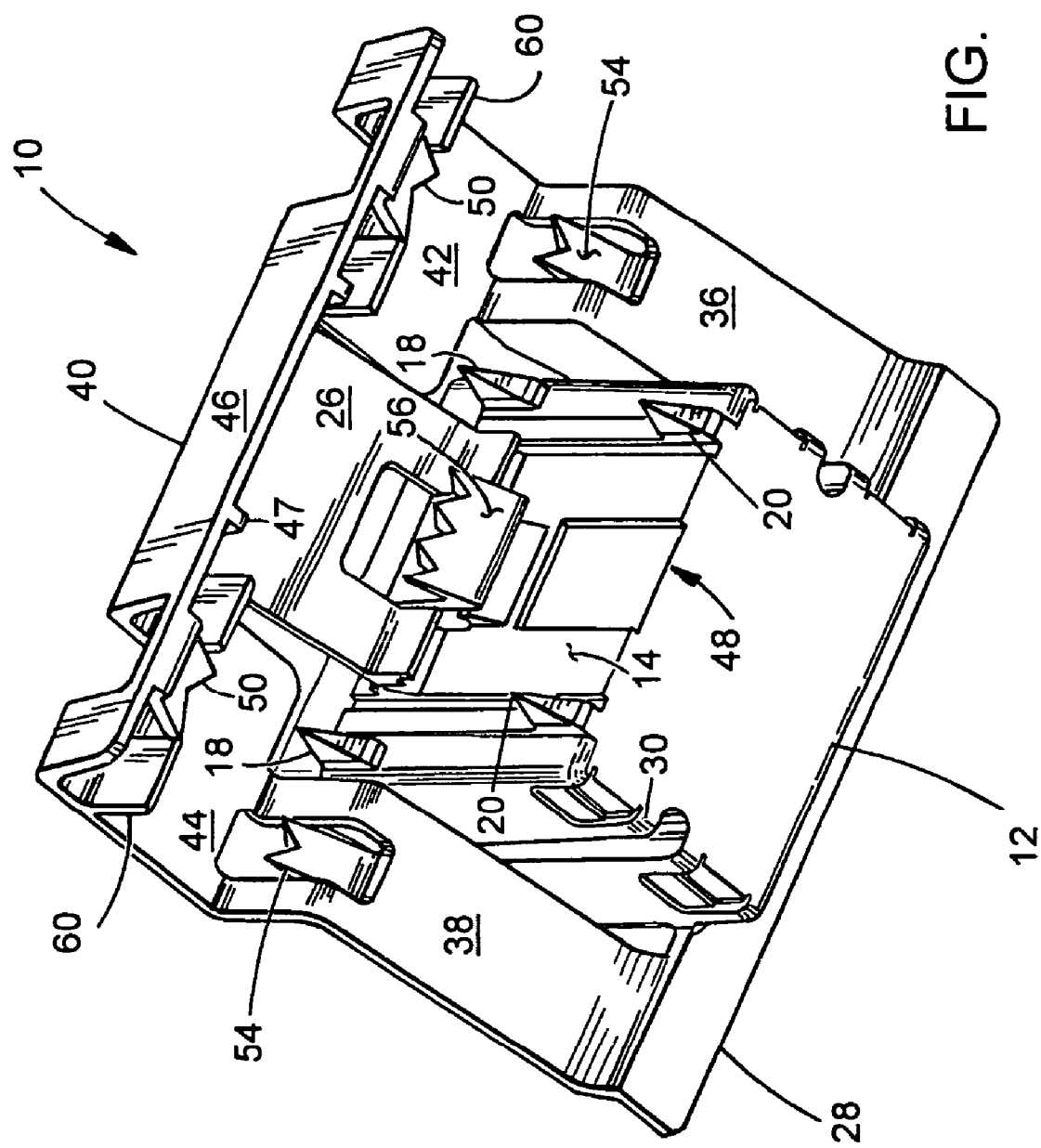
FIG. 2 is a bottom perspective view of the invention.

Referring to the Figures, an electrical box assembly 10 is shown comprising an enclosure, i.e., a box 12, and a bracket 40. It should be understood from the outset, that the box 12 can comprise a single or a multiple gang outlet box. Also, box 12 can comprise a combo box or enclosure of the type shown in U.S. Pat. No. 6,727,428 wherein both a power connection and a low voltage connection can be made. Furthermore, the box 12 can comprise simply a low voltage frame similar to the low voltage frame shown and described in the above U.S. patent. Other structures are equally likely for the box 12 and are meant to be included herein.

In one preferred embodiment, the exterior of side 14 of the box 12 is configured with first teeth 18, second teeth 20 and one or more latches 22. The teeth 18, 20 extend into a stud cavity 24 for subsequent embedment into the stud. The latches 22 are of common design and are configured to latch closed a clamping leg 26 that also extends into the stud cavity 24. In the normal uninstalled state of box assembly 10, side 14 is generally parallel with the stud cavity 24.

A strut 28 extends from exterior side 16 (opposite side 14) of box 12 proximate an end region 30 of the box. In the embodiment shown, the strut 28 extends beyond sides 32, 34 of box 12 to mate with arms 36, 38. Preferably, the strut 28 and the arms 36, 38 are integrally molded about the periphery of box 12 whereby movement of end region 30 with regard to stud cavity 24 is restrained. In one preferred embodiment, box 12 includes arms 36, 38, without any interconnecting strut.

Bracket 40 is preferably spaced a distance from side 14 of the box 12. Any forces passing between the box 12 and bracket 40 can thus pass through arms 36, 38. Arms 36 and 38 may be configured with both horizontal and vertical components so that these forces may be transmitted between the two with little deflection of the arms themselves.

As shown, the bracket 40 is composed of a first region 42 which joins first arm 36; a second region 44 which joins second arm 38; a clamping leg 26 projecting into stud cavity 24; and a flange 46 extending from and generally perpendicular to arms 36, 38. Clamping leg 26 and flange 46 are interconnected such that movement of the clamping leg 26 results in movement of flange 46 (or at least force transfer thereto). In one preferred embodiment, the rigidity of the interconnection between the flange 46 and the clamping leg 26 is further enhanced by employing stiffeners 47 which extend perpendicularly from bracket 40 (See FIG. 3).

In one preferred embodiment, the clamping leg 26 extends from the bracket and into the cavity 24. The leg is preferably movable between a first stud-receiving position and a second stud-securing position. Insertion of a stud into the cavity 24 moves the clamping leg 26 from the stud-receiving position to the stud-securing position, thereby securing the enclosure to the stud.

Movement of the clamping leg 26 causes a like movement of the flange 46 towards the stud due to their interconnection. This movement creates a pinching or squeezing force upon the stud between the flange 46 and the side 14 of the box 12 and more particularly between the flange 46 and end region 30 of the box 12 (e.g., teeth 20). The more the clamping leg 26 is moved, the greater the pinching force between the flange 46 and the teeth 20. As indicated above, the movement of the teeth 20 away from the stud is resisted by arms 36, 38 and by strut 28, hence such a squeezing force or bias is automatically created upon the movement of the clamping leg 26 towards bracket regions 42, 44.

As the clamping leg 26 continues to be moved towards bracket regions 42, 44, it eventually becomes latched in place via latches 22. Hence, once the clamping leg 26 is latched in place, the full pinching force of the box assembly 10 upon the stud is automatically achieved. Of course, should the clamping leg 26 become un-latched, the pinching force is released and the box assembly 10 can be moved or re-positioned as desired.

Referring further to FIGS. 3-5, the teeth 18, 20 are shown projecting into the stud cavity 24. Some teeth, such as flange side teeth 50, may extend from the flange 46 while other teeth, such as the first and second teeth 18, 20 may extend from an opposite side. Obviously, as the flange 46 is moved towards the stud and the pinching force as described above is created, cantilevered flange teeth 50 are caused to bite into the stud. Likewise, the force or bias applied by the flange 46 upon the stud simultaneously force teeth 18, 20 to also bite into the stud. Any attempted deflection of the box 12 (and hence box teeth 18, 20) away from the stud is resisted by arms 36 and 38. Thus the force applied by the flange 46 against the stud due to the movement of the clamping leg 26 results in the embedment of the teeth 18, 20 into the stud, not the deflection away from the stud of box assembly 10.

Flange teeth 50 are preferably positioned directly opposite the arms 36, 38 for greater embedment force. Other teeth along flange 46 are equally conceivable. In addition, the bracket may include arm teeth 54 that are positioned in alignment with arms 36, 38. The bracket may additionally include clamping leg teeth 56 which are secured to or depend from the latching mechanism of the clamping leg 26.

It will be appreciated by those skilled in the art that the configuration and arrangement of flange teeth 50 and arm teeth 54 cause such teeth to bite into the stud even further should box assembly 10 be moved or loaded. This arrangement provides for assured and continued gripping of the stud after initial installation.

It should also be pointed out that the stud cavity 24 may be further defined by a series of alignment guides 58 depending from the underneath side of bracket 40 or extending from the flange 46. These alignment guides 58 help position the stud within the stud cavity 24. Guides 58 also may provide a set-off or space by which the user may grab or manipulate the flange 46 if need be. This set-off may further be employed to release box assembly 10 from the stud for subsequent deployment. Of course, flange teeth 50 can extend into stud cavity 24 some distance beyond these guides 58.

The top surface of the bracket 40 and the clamping leg 26 may also be configured with alignment indicia 60 so that the installer can readily position the box assembly 10 at the correct location on the stud. Such indicia may take the form of a line, a marker, a slot, an opening or something else, the chosen design being determined by the manufacturer from a variety of possibilities.

The material of box assembly 10 is preferably one of the common plastics currently available and its method of manufacture is preferably molding. Likewise, other methods of manufacture may be employed to create this assembly other than molding. Also, ideally, box assembly 10 is of one piece construction. However, it is contemplated herein that box 12 could be manufactured separately from bracket 40 and thereafter secured together, provided that the box 12 and bracket 40 are affixed together in a manner such that forces may be transferred between them.

Referring now to FIGS. 6-9, in operation, as the stud enters the stud cavity 24, the stud engages the clamping leg 26 and clamping leg teeth 56. Further insertion of the stud results in the movement of the clamping leg 26 and the consequential movement of the flange 46 as described above. Continued insertion of the stud into the cavity 24 causes one or more teeth 18, 20 to deflect so that a portion of the stud passes their beveled edges. As can be seen, as the clamping leg 26 becomes more and more flush with bracket regions 42, 44, the stiffness or rigidity of the bracket 40 increases. Such rigidity can create a pinching force between the flange 46 and end region 30 of the box 12. This pinching force results in part from the restraint on the movement of end region 30 away from the stud as a result of arms 36, 38. Upon the latching of the clamping leg 26 with mating latch 22, teeth 18, 20 are fully biased into engagement with the stud.

As can thus be seen, no secondary operation is required to affix the box assembly 10 to the stud. Rather, the stud is simply inserted into stud cavity 24, and the clamping leg 26 is latched. Indicia 60 may aid the installer by providing a guide so that the box assembly 10 is properly located along the stud. Also, the underside of each latch 22 can be ramped to make it easier to move the clamping leg 26 into its closed position.

One advantage of this box assembly 10 is that any deflection of the box 12 or bracket 40 is resisted so that full engagement of the teeth 18, 20 onto the stud can be achieved. Such engagement may result in an installed box assembly 10 that complies with code requirements concerning resisting removal and/or movement.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. An electrical box assembly for nail-free mounting to a stud, comprising:
    an electrical enclosure;
    a bracket affixed to the enclosure, the bracket defining a stud-receiving cavity extending along an edge of the enclosure, the cavity having a width extending in a direction perpendicular to said edge; and
    a clamping leg extending from one of the enclosure and the bracket, the leg extending into the cavity and across the substantial width of the cavity, the leg being movable between a first stud-receiving position and a second stud-securing position whereupon insertion of the stud into the cavity moves the clamping leg from the stud-receiving position to the stud-securing position thereby securing the enclosure to the stud.

2. The electrical box assembly of claim 1, wherein said clamping leg extends from the bracket and in a direction towards said enclosure.

3. The electrical box assembly of claim 2, wherein the bracket includes a flange extending from an edge thereof, the flange having at least one tooth for engagement with the stud and cooperating with the clamping leg whereby movement of the leg to the stud-receiving position causes movement of the flange which forces the at least one tooth into engagement with the stud.

4. The electrical box assembly of claim 3, wherein the at least one tooth extends angularly from the flange.

5. The electrical box assembly of claim 4, wherein the flange includes a plurality of teeth extending into the cavity for engagement with the stud.

6. The electrical box assembly of claim 2, further comprising at least one tooth extending into the stud receiving cavity from a location adjacent the electrical enclosure.

7. The electrical box assembly of claim 2, further comprising at least one tooth extending into the stud receiving cavity from a location adjacent the bracket.

8. The electrical box assembly of claim 2, further comprising at least one latch to secure the clamping leg in the stud-receiving position.

9. The electrical box assembly of claim 8, wherein the at least one latch is mounted on the electrical enclosure.

10. The electrical box assembly of claim 2, further comprising one or more arms secured to the bracket, the one or more arms securing the electrical enclosure to the bracket and resisting movement of the electrical enclosure with respect to the bracket.

11. The electrical box assembly of claim 10, further comprising a strut secured to the electrical enclosure and coupled to the one or more arms.

12. The electrical box assembly of claim 2, wherein the electrical enclosure comprises at least one of a single gang electrical outlet box, a multiple gang electrical outlet box and a low voltage outlet frame.

* * * * *